United States Patent
Bauer et al.

(10) Patent No.: US 6,196,800 B1
(45) Date of Patent: Mar. 6, 2001

(54) ROTOR BLADE FOR A BEARINGLESS ROTOR OF A HELICOPTER

(75) Inventors: Karl Bauer, Waakirchen/Schaftlach; Gerald Kuntze-Fechner, Waakirchen; Gerhard Hausmann, Munich; Bernhard Enenkl, Bockhorn, all of (DE)

(73) Assignee: Eurocopter Deutschland GmbH, Donauwoerth (DE)

( * ) Notice: Subject to any disclaimer, the term of this patent is extended or adjusted under 35 U.S.C. 154(b) by 0 days.

(21) Appl. No.: 09/321,340

(22) Filed: May 27, 1999

(30) Foreign Application Priority Data

May 28, 1998 (DE) .............................................. 198 23 794
Apr. 1, 1999 (DE) .............................................. 199 15 085

(51) Int. Cl.$^7$ .................................................. B64C 27/50
(52) U.S. Cl. .................... 416/134 A; 416/140; 416/107; 416/500; 416/230
(58) Field of Search ............................... 416/134 A, 138, 416/140, 141, 106, 107, 500, 230

(56) References Cited

U.S. PATENT DOCUMENTS

| | | | |
|---|---|---|---|
| 4,097,193 | * 6/1978 | Brunsch et al. | ...................... 416/224 |
| 4,244,677 | 1/1981 | Noehren et al. . | |
| 4,427,340 | 1/1984 | Metzger et al. . | |
| 4,676,720 | 6/1987 | Niwa et al. . | |
| 4,690,616 | 9/1987 | Hahn et al. . | |
| 4,746,272 | 5/1988 | Noehren et al. . | |
| 4,874,292 | * 10/1989 | Matuska et al. | ...................... 416/140 |
| 4,892,461 | 1/1990 | Matsumoto et al. . | |
| 4,898,515 | 2/1990 | Beno et al. . | |
| 5,096,380 | 3/1992 | Byrnes et al. . | |
| 5,372,479 | 12/1994 | Byrnes et al. . | |
| 5,820,344 | 10/1998 | Hamilton et al. . | |

FOREIGN PATENT DOCUMENTS

| | | |
|---|---|---|
| 2927263 | 1/1980 | (DE) . |
| 3526470 | 1/1987 | (DE) . |
| 3707333 | 9/1988 | (DE) . |
| 3734592 | 5/1989 | (DE) . |
| 0097885 | 1/1984 | (EP) . |
| 0155444 | 9/1985 | (EP) . |
| 0315962 | 5/1989 | (EP) . |

OTHER PUBLICATIONS

S. Emmerling et al.; Die Entwicklung eines neuen Hubschrauberrotors (ATR) ("The Developement of a New Helicopter Rotor (ATR)"), Pub. No. ECD–0063–96–PUB, Eurocopter Deutschland GmbH, Annual Conference of Deutsche Gesellschaft fuer Luft und Raumfahrt (DGLR), Sep. 24 to 27, 1996, Dresden, Germany.

"The Bearingless Main Rotor", by Franklin D. Harris et al.; Proceedings of the European Rotorcraft and Powered Lift Aircraft Forum, France; Sep. 7–9, 1977, Paper No. 4; pp. 4–1 to 4–9.

* cited by examiner

Primary Examiner—Edward K. Look
Assistant Examiner—Richard Woo
(74) Attorney, Agent, or Firm—W. F. Fasse; W. G. Fasse

(57) ABSTRACT

A rotor blade arrangement for a bearingless rotor of a helicopter includes a flexbeam connecting an airfoil blade to a rotor head, and a control sleeve surrounding the flexbeam. The control sleeve is relatively stiff, but the flexbeam has portions that are flexible so as form a fictitious flapping hinge, lead-lag hinge, and torsion axis, which respectively enable flapping, lead-lag pivoting, and torsional movements of the airfoil blade. The inboard end of the control sleeve is secured to the root end of the flexbeam near the rotor head to prevent lateral displacements therebetween. Damping elements are arranged within the enclosure of the control sleeve at a location between the fictitious lead-lag hinge of the flexbeam and the transition region at which the flexbeam transitions into the airfoil blade. The damping elements are preferably arranged laterally next to the flexbeam in the lead-lag plane, and are secured on the one hand to the control sleeve, and on the other hand to a securing plate that is connected to the flexbeam and the airfoil blade.

21 Claims, 5 Drawing Sheets

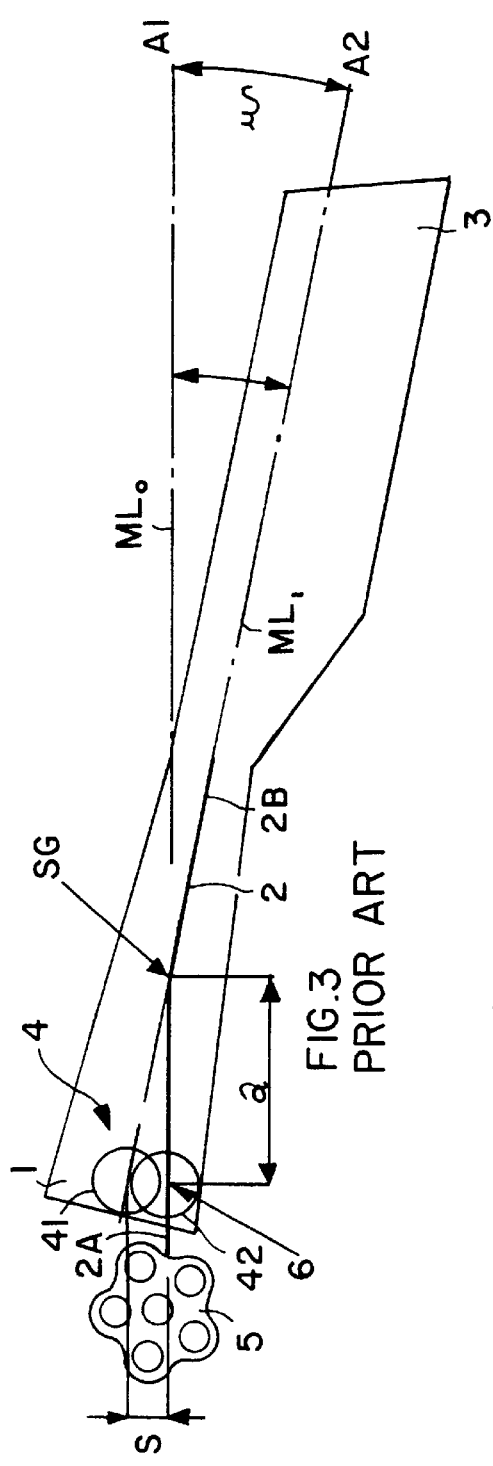
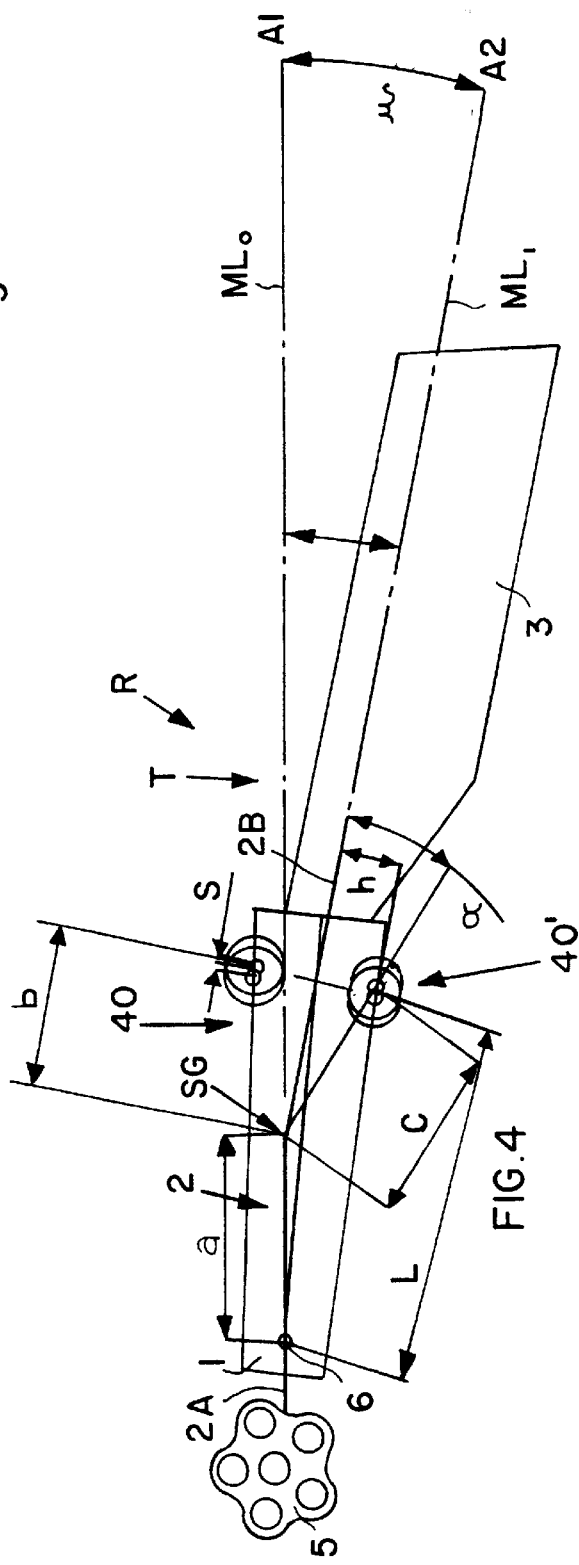

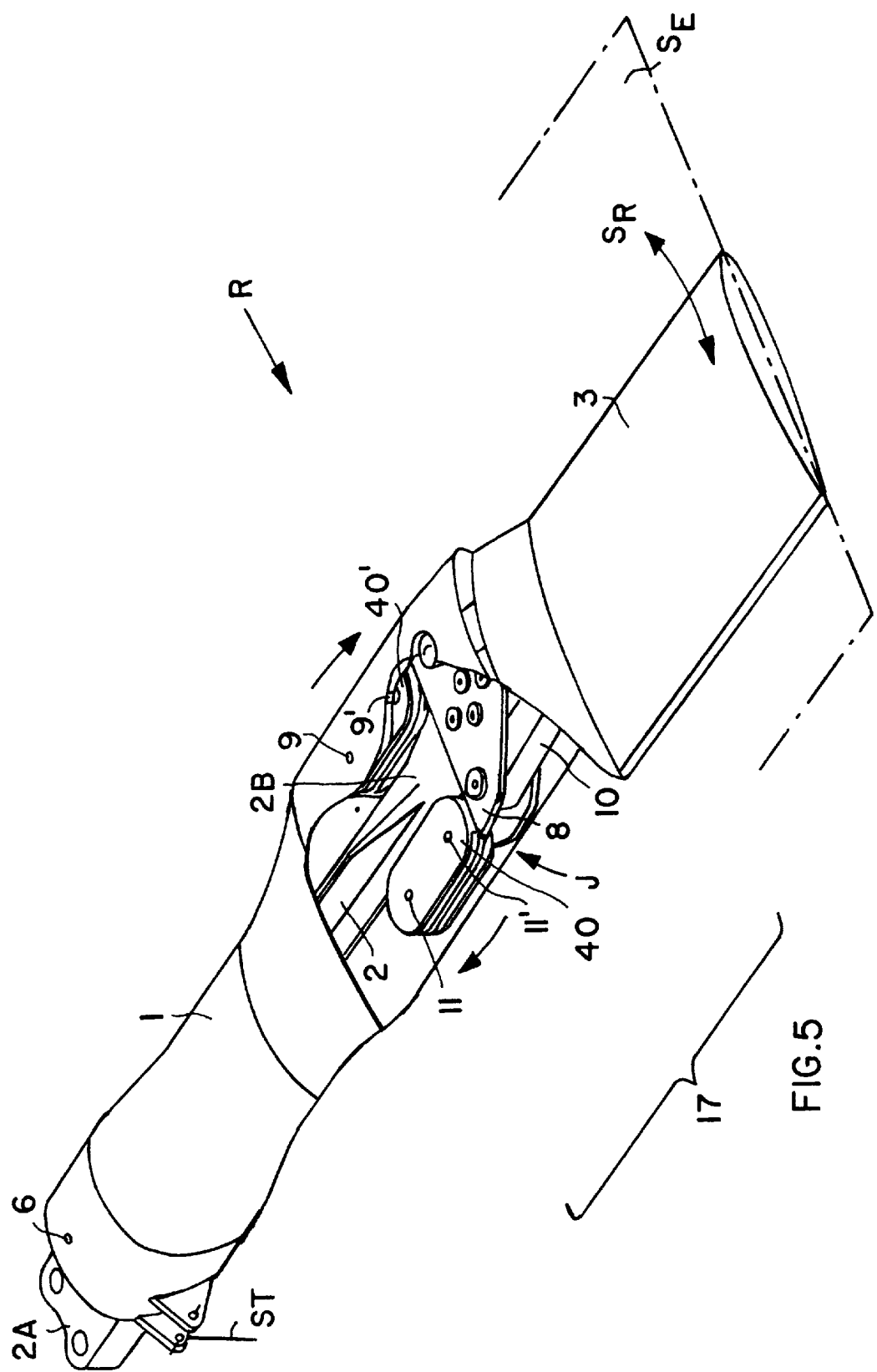

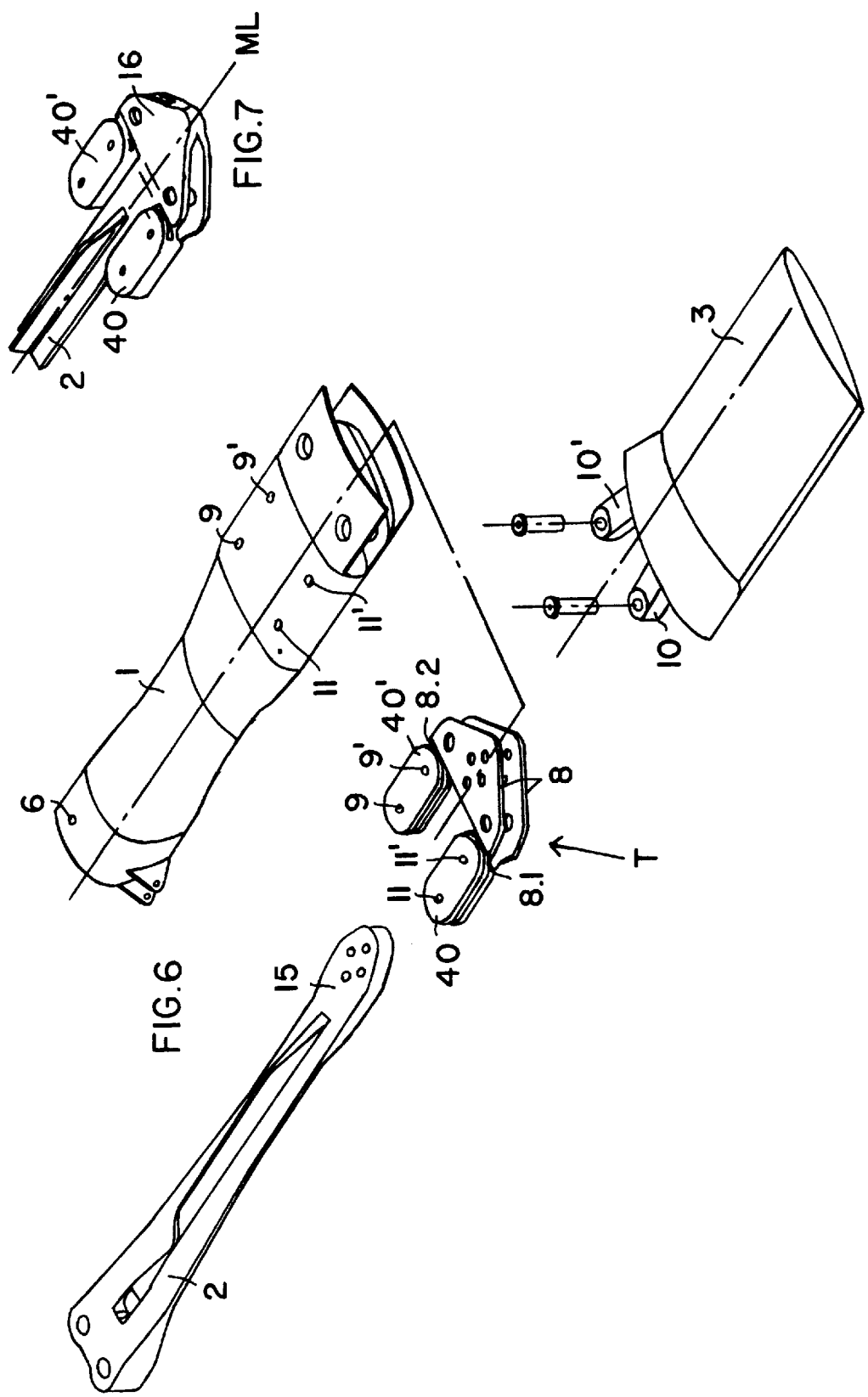

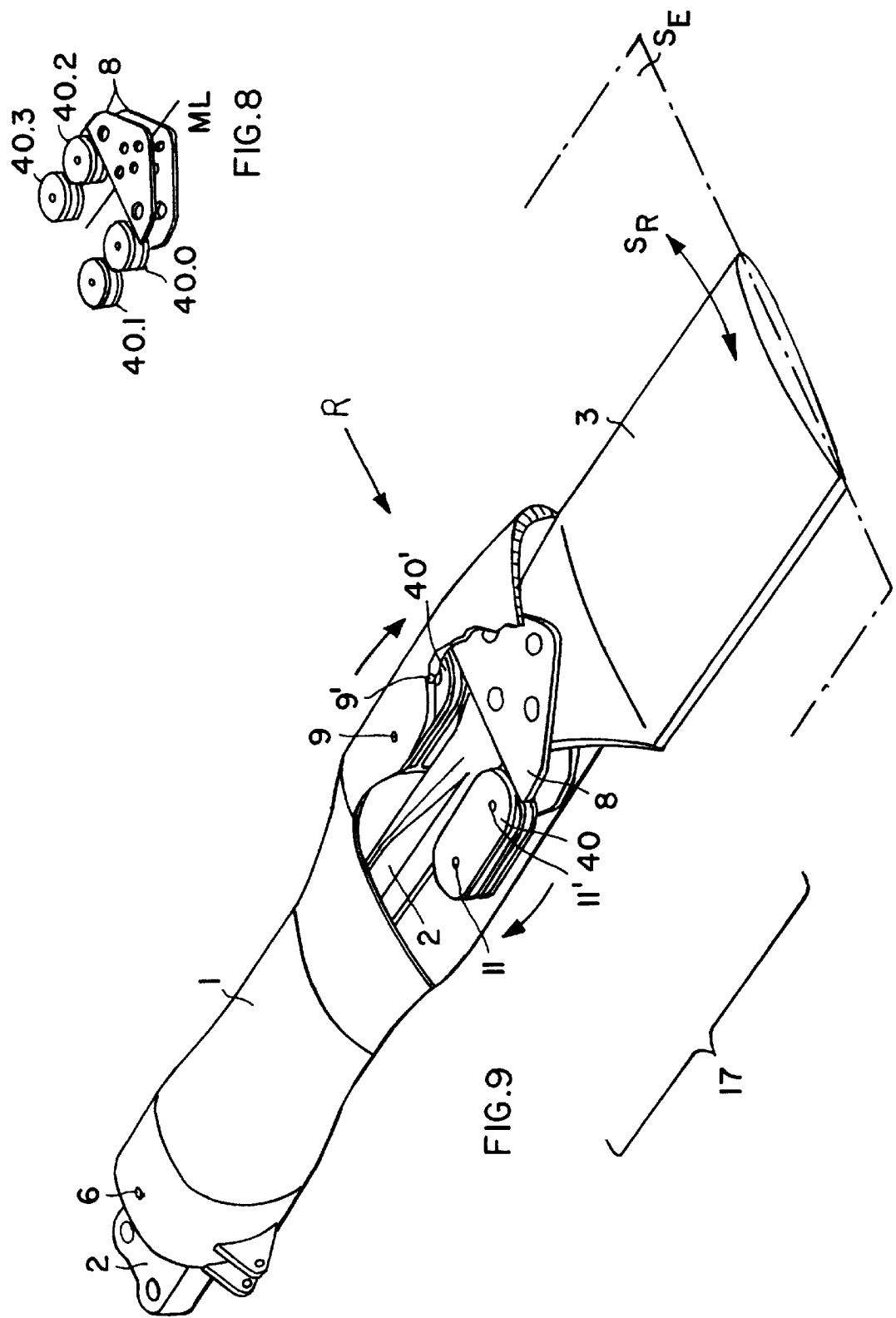

ROTOR BLADE FOR A BEARINGLESS ROTOR OF A HELICOPTER

PRIORITY CLAIM

This application is based on and claims the priority under 35 U.S.C. §119 of German Patent Application 198 23 794.4, filed on May 28, 1998, and German Patent Application 199 15 085.0, filed on Apr. 1, 1999, the entire disclosures of which are incorporated herein by reference.

FIELD OF THE INVENTION

The invention relates to a rotor blade for a bearingless rotor of a helicopter including a flexbeam having integrated flexible zones forming fictitious bearingless hinges that allow flexible bending in respective flapping, lead-lag pivoting, and torsional directions, a control sleeve that surrounds the flexbeam and that is connected at a transition region between the flexbeam and the lift-generating airfoil blade, as well as damping elements for damping vibrations or oscillations of the rotating rotor blade in the lead-lag plane.

BACKGROUND INFORMATION

Present day rotor blades for helicopters are predominantly made of fiber composite materials. Since the rotor blades are deflected in various directions during operation of the helicopter, the blades are thereby subjected to high loads. A rotor blade of a bearingless rotor includes a so-called flexbeam or flexible spar, i.e. a structural element that is torsionally and flexibly soft, provided at the inboard end of the rotor blade adjoining the rotor head. The flexibility of this flexbeam enables the necessary deflection movements of the blade in the flapping direction, the lead-lag direction, and the torsional twisting direction to achieve pitch angle variations. Furthermore, the flexbeam carries and transmits the centrifugal force of the rotor blade into the rotor head.

The torsionally soft or flexible region of the flexbeam is located within a torsionally stiff control sleeve or torque tube, by means of which the control motions for achieving a pitch control of the blade are transmitted into the lift-generating airfoil blade portion of the rotor blade. In order that the flexbeam may be manufactured separately from the blade, or that the flexbeam may be replaced in the event of damage or the like, a separatable junction is typically provided between the flexbeam and the lift-generating airfoil portion of the rotor blade. Such a rotor blade is called a two-piece blade construction. The separatable junction also allows the rotor blade to be folded, for example by removing connectors or fasteners such as bolts or the like from the junction, whereby the rotor blade may be pivoted in the lead-lag direction into a folded position in which the rotor requires less space, so that the helicopter may be stored or received in a transportation vehicle such as an aircraft, a ship, or a ground vehicle for transporting the helicopter in a space-saving manner.

The control sleeve or torque tube is connected to a control system of the helicopter, so that control movements can be transmitted into the lift-generating airfoil blade via the control sleeve. Such a control movement especially refers to an angular deflection of the rotor blade about its torsional axis or central lengthwise axis, in order to change the pitch of the blade. In the rotating rotor blade, in connection with the pitch deflection, the blade also undergoes a pivoting or oscillating motion away from the nominal rotor blade lengthwise axis in a so-called lead-lag plane, i.e. a plane that is substantially identical to the rotation plane of the rotor blade.

In order to ensure an adequate ground and air resonance stability of the rotor, the lead-lag pivoting or oscillating movements of the rotor blade must be damped, for which dampers or damping elements are necessary. Such dampers or damping elements, which are also known as snubbers, typically comprise a multi-layered elastomeric composite including plural elastomeric layers, and usually also including metal layers for reasons of strength and stiffness. The required damping is provided by the periodic shearing strain and deformation of these elastomeric layers.

In previously known rotor blade constructions, the damping elements are arranged between the point at which the rotor blade is connected to the rotor head and the fictitious lead-lag hinge formed by the lead-lag flexing region. Moreover, for example in the disclosure of German Patent 35 26 470 and corresponding U.S. Pat. No. 4,690,616 (Hahn et al.), the damping elements are arranged outside of the control sleeve, and particularly on the outer wall of the control sleeve near the inboard edge thereof adjacent to the rotor head. The damping elements are located directly above and below the flexbeam. Thereby, the damping elements are arranged perpendicularly above and below the lead-lag plane of the rotor blade.

Due to the relatively large resulting spacing between the damping elements and the fictitious lead-lag hinge in the above prior art arrangement, this results in a relatively large deflection or deformation distance of the damping element layers as the blade undergoes the lead-lag oscillations, which in turn leads to the requirement of a relatively large structural height of each overall damping element in order to achieve a sufficient operating lifetime of the damping element. The relatively large structural height of the damping elements and their arrangement above and below the flexbeam have a negative influence on the aerodynamic characteristics of the blade arrangement. Furthermore, the external placement of the damping elements can also interfere with the free mobility of the control rods or rotor head covers or the like.

The conventional damping elements having a high structural height themselves also suffer disadvantages. Such damping elements consist of several stacked elastomeric layers, with stiffer layers interposed therebetween in order to take up the axial loads. Such dampers are relatively costly and complicated to manufacture, resulting in a rather high cost for the finished element. In order that damping losses do not arise, the mounting or attachment of the damping elements and the force transmission between the damping elements and the rotor structure must be carried out with tight tolerances, without play, and with a very stiff resulting structure. These factors also contribute to the complexity and cost of manufacturing and installing such conventional damping elements in the conventional arrangement.

German Patent Laying-open Publication 37 07 333 recognizes the problem that a damping of the lead-lag oscillation of the rotor blade is necessary due to possible unstable oscillations of the rotor blade especially during the run-up and the run-out of the rotor, and teaches how the damping problem can be solved by appropriate linkage connection of the control rod. Dampers are arranged on both sides of the root of a one-piece or integral rotor blade, wherein the root of the rotor blade is secured to the rotor head and forms a part of the flexbeam or flexible spar. The control rod is connected directly to a stiff connecting member interposed between the damping arrangement and the flexible spar.

Even though such an arrangement according to German Patent Laying-Open Publication 37 07 333 repositions the dampers from the outside surface of the control sleeve into the interior of the control sleeve and thereby closer to the area of the flexbeam root, there still exist relatively large displacements of the damping layers because the spacing between the damping elements and the fictitious lead-lag hinge still remains relatively large in such an arrangement. Once again, such a high displacement or high strain loading of the damping elements leads to the need of a relatively large structural height of the damping element in order to achieve an adequate operating life, because a thinner damping layer or fewer damping layers would not be able to durably provide the required total degree of displacement. Once again also, such dampers are complex and costly in their manufacturing, resulting in a high finished product cost. Basically, the arrangement suggested by German Patent Laying-Open Publication 37 07 333 simply achieves an improvement of the aerodynamic characteristics, by moving the damping elements from the outside to the inside of the control sleeve.

According to German Patent 29 27 263 and corresponding U.S. Pat. No. 4,244,677 (Noehren et al.), the damping elements are also arranged in the area of the root of the flexbeam within the control sleeve or housing, generally corresponding to the above described other conventional arrangements. German Patent Laying-Open Publication 37 34 592 also uses a damping arrangement generally located in the area of the root of the flexbeam, and provides the further improvement that the damping arrangement is positioned in the lead-lag plane. Nonetheless, relatively large deflections of the single damping element still arise and a relatively large structural height of the damping element is necessary, in view of the spacing between the damping element and the fictitious lead-lag hinge.

SUMMARY OF THE INVENTION

In view of the above, it is an object of the invention to provide an arrangement of damping elements in connection with a rotor blade for a bearingless rotor of a helicopter, whereby the damping deflections of the damping elements can be made smaller, in order to realize substantially flatter forms or configurations of damping elements, which reduce the total structural height of the damping arrangement, and which are simpler and more economical than prior art damping arrangements. The invention further aims to avoid or overcome the disadvantages of the prior art, and to achieve additional advantages, as apparent from the present specification.

The above objects have been achieved in an improved damping arrangement according to the invention wherein the damping elements are arranged at a location displaced in an outboard direction relative to the fictitious lead-lag hinge or lead-lag flexurally soft region of the flexbeam. Throughout this specification, the term "outboard" refers to a direction toward the free outer tip of the rotor blade, while the term "inboard" refers to a direction toward the blade root connected to the rotor head of the helicopter. Particularly, the damping elements are arranged at a location between the fictitious lead-lag hinge and outboard end of the control sleeve or the outboard boundary of the transition region in which the flexbeam is connected to and transitions to the lift-generating airfoil blade. Most particularly, the damping elements are arranged and connected to the rotor blade and the control sleeve in the transition region itself.

With this arrangement, the transmission ratio characteristic, by which lead-lag oscillation movements of the rotor blade cause a corresponding deflection of the damping element, is changed relative to prior art arrangements, whereby a smaller deflection of the damping element is achieved. During the overall damper deflection, the damping elastomeric layers of a damping element are subjected to an intermittent shearing strain or displacement relative to their respective initial resting position. A projection or projected image of the upper deflected elastomeric layer onto the lower elastomeric layer exhibits a varying degree of overlap over the lower elastomeric layer responsive to the shearing strain or displacement. This shearing strain or displacement is also generally called the damping deflection.

One advantage provided by the achievable smaller damping deflection according to the invention is that the projection of the deflected upper damping layer onto the lower damping layer has a relatively large degree of overlap, whereby smaller moments and therewith a lower shear tension level result. Thereby, the degree of loading of the damping element is reduced, so that the number and/or thickness of the damping layers can be reduced. Correspondingly, the total structural height of a damping element can be considerably reduced.

Using such damping elements having a smaller structural height in a rotor blade arrangement allows a more advantageous use of the interior space enclosed within the control sleeve, and/or allows the control sleeve to be configured in an aerodynamically improved manner. As a further point, the control sleeve can be made smaller or more compact overall. Also, the fairing or covering of the rotor head can be configured more aerodynamically. As a further advantage, the damping elements can be arranged in such a manner that they are all equally loaded during operation, which helps to prevent accelerated failure of particular individual damping elements.

An optimal and particularly advantageous embodiment of the invention involves the arrangement of damping elements laterally next to the sides of the flexbeam in the lead-lag plane, at a location between the fictitious lead-lag hinge and the transition region of the rotor blade. With such an arrangement, the damping elements can most effectively damp the lead-lag oscillations of the rotor blade. Moreover, the damping elements are thereby arranged completely within the control sleeve which leads to aerodynamic advantages, among others. Also, the spacing of the individual damping elements relative to the lengthwise central axis of the flexbeam is especially small, which results in especially small deflection distances of the elastomeric layers of the damping elements. Especially in so-called two-piece rotor blades having a separatable joint or junction in the transition region, the damping elements can be located at the junction while making use of the existing space in the control sleeve at the transition region. Particularly, the damping elements in such an arrangement are connected to the existing securing plate that serves for connecting the head of the flexbeam with the lift-generating airfoil blade, while the damping elements provide a damped connection between the securing plate and the outboard end of the control sleeve.

According to a further embodiment, the damping elements are releasably or removably connected with the enclosing control sleeve and with the rotor blade, which allows the respective damping elements to be replaced very quickly and easily when necessary. In this context, the damping element is secured to the directly surrounding sleeve surface of the control sleeve by means of bolts, screws, pins, rivets or other conventional securing means. In a particular embodiment, on the one hand the damping element is connected to the securing plate that connects the flexbeam with the lift-generating airfoil blade, and on the other hand the damping element is connected to the control sleeve. According to another variation, the flexbeam head itself is embodied as a securing plate or mounting fixture, whereby the need of a separate securing plate is avoided.

In order to keep the overall structural size of the control sleeve small and thereby optimize the aerodynamic characteristics of the control sleeve, it can be necessary in some applications to keep the cross-sectional area of the dampers as small as possible. To achieve this, it can be advantageous to arrange plural damping layers stacked one over the other, whereby the projected surface of the damping element is sharply reduced and the damping elements can be better integrated into the control sleeve. Another advantageous compact embodiment of the damping arrangement calls for plural damping elements to be arranged one behind another in a plane, and particularly the lead-lag plane, preferably in a row parallel to the lengthwise central axis of the flexbeam of the respective rotor blade. In this manner, the lateral dimension or width of the control sleeve can be reduced, whereby the aerodynamic characteristics can be further improved.

BRIEF DESCRIPTION OF THE DRAWINGS

In order that the invention may be clearly understood it will now be described in connection with example embodiments, with reference to the accompanying drawings, wherein:

FIG. 3 is a schematic top plan diagram illustrating the functional principle of the damping kinematics of the prior art damping arrangement according to FIGS. 1 and 2;

FIG. 4 is a schematic top plan diagram illustrating the functional principle of the damping kinematics of damping elements arranged outboard from a lead-lag hinge of the flexbeam according to the invention;

FIG. 5 is a partially broken open perspective view of an arrangement of damping elements according to the invention in the transition region of a two-piece rotor blade;

FIG. 6 is an exploded view of the components of the arrangement according to FIG. 5;

FIG. 7 is a perspective view of the head of a flexbeam embodied with an integrated securing plate;

FIG. 8 is a perspective view of the arrangement of damping elements one behind another in a row parallel to the lengthwise central axis of the flexbeam and in the lead-lag plane, according to the invention; and FIG. 9 is a partially broken open perspective view of a one-piece rotor blade with damping elements arranged in a transition region between the flexbeam and the lift-generating airfoil blade, according to the invention.

DETAILED DESCRIPTION OF PREFERRED EXAMPLE EMBODIMENTS AND OF THE BEST MODE OF THE INVENTION

Figure 1:
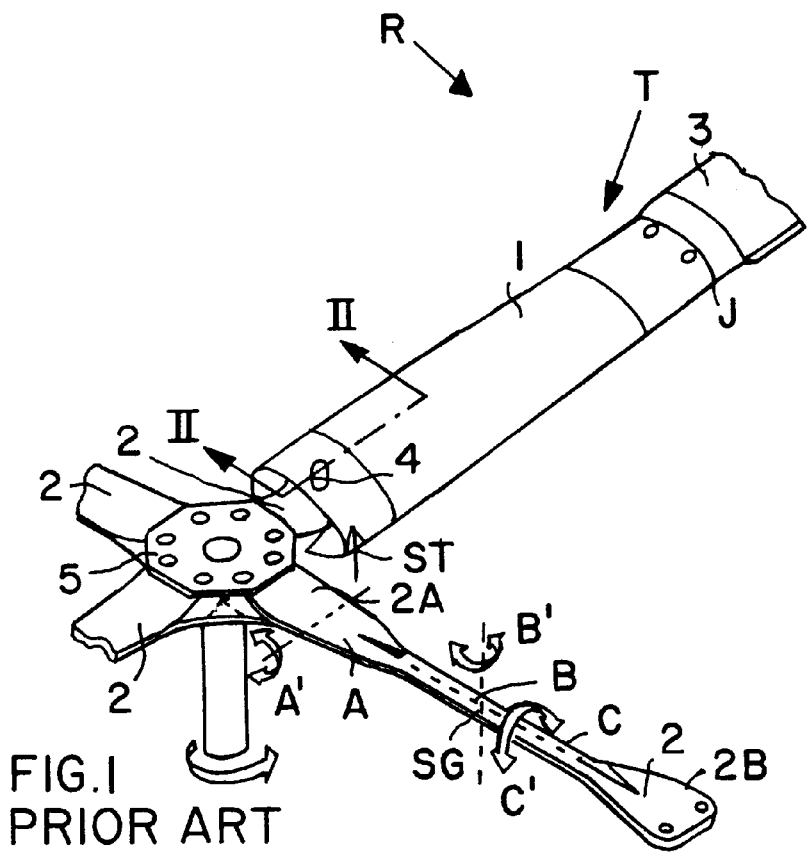
FIG. 1 is a schematic perspective view of an arrangement of damping elements externally on a control sleeve of a helicopter rotor blade according to the prior art.

FIG. 1 schematically illustrates a prior art arrangement of a helicopter rotor having four rotor blades. The blades are connected to a rotor head 5, including a rotor hub and a rotor shaft or mast. The main structure of each rotor blade R includes a region or portion forming the lift-generating airfoil blade 3 as well as a flexbeam 2 extending from the airfoil blade 3 to the rotor head 5 in the lengthwise direction of the respective rotor blade R. The flexbeam 2 is typically a structural component made of a fiber composite material. The inboard end of the flexbeam 2 that is directed toward and connected to the rotor head 5 is referred to as the flexbeam root 2A. The outboard end of the flexbeam 2, i.e. the end opposite the root 2A, is referred to as the flexbeam head 2B, which is connected or transitions into the airfoil blade 3 in a transition region T.

If the transition region T is embodied as an integral connection without any seam or joint, the rotor blade R is generally referred to as a one-piece rotor blade. On the other hand, if the transition region T includes a junction or joint J between the flexbeam 2 and the airfoil blade 3, then the rotor blade R is generally designated as a two-piece rotor blade. The particular blade construction shown in FIG. 1 includes a joint or junction J in the transition region T between the flexbeam 2 and the lift-generating airfoil blade 3. Such a joint or junction J makes it possible to easily exchange or replace either the flexbeam or the airfoil blade for maintenance or repair purposes, or to fold the rotor blade as discussed above. The present invention as described herein is applicable to both a one-piece rotor blade as well as a two-piece rotor blade.

The overall rotor blade R arrangement further includes a control sleeve 1 that generally surrounds and extends axially along the flexbeam 2, and is connected in a rigid or form-locking manner to the airfoil blade 3 in the transition region T according to the prior art, both in one-piece blades and in two-piece blades. The control sleeve 1 is relatively stiff, both in flexion and torsion, and serves to transmit torsional moments from a control rod or linkage St into the airfoil blade 3 in a form-locking manner, for achieving a pitch control of the airfoil blade 3. The respective boundaries of the transition region T are specified on the one hand by the possibility of connecting the control sleeve 1 to the lift-generating airfoil blade 3, and on the other hand by the possibility of connecting the control sleeve 1 to the flexbeam 2. In other words, the region between these two boundaries is designated as the transition region T.

The flexbeam 2 comprises integrated flexible or bendable regions, namely a flapping hinge region A, a lead-lag hinge region B, and a torsional or pitch hinge region C, for allowing bending movements respectively about the axes A', B' and C'. The control rod linkage St is connected by any suitable securing means or fastener to the surface of the torsionally stiff control sleeve 1. This control rod linkage St forms a part of the control system of the helicopter, by means of which a control force for achieving a pitch angle adjustment of the rotor blade R is achieved and applied to the airfoil blade 3. The control force for achieving the pitch angle adjustment is transmitted from the control rod link St through the control sleeve 1 to the head end 2B of the flexbeam or to the lift-generating airfoil blade 3, whereupon the flexbeam 2 allows a torsional twisting along its lengthwise central axis (particularly in the torsionally soft region C about the torsion axis C') to allow a pitch angle adjustment of the airfoil blade 3.

When the rotor blade R is rotating while carrying out such a pitch angle adjustment, the rotor blade R will undergo a flapping movement or oscillation in a direction perpendicular to the rotation plane, as well as a lead-lag movement or oscillation in the lead-lag plane which essentially corresponds to the rotation plane of the rotor blade R. For this reason, the flexbeam 2 embodies a virtual or fictitious flapping hinge in the flapping region A and a virtual or fictitious lead-lag hinge in the lead-lag bendable region B as mentioned above. Due to the lead-lag oscillation of the rotor blade R, it also becomes necessary to provide damping elements 4, 4', which are particularly arranged vertically one above the other, above and below the control sleeve 1, namely on the upper outer surface and on the lower outer surface of the control sleeve 1. These damping elements 4 and 4' serve to damp out and thereby control the lead-lag oscillation of the rotor blade.

Figure 2:
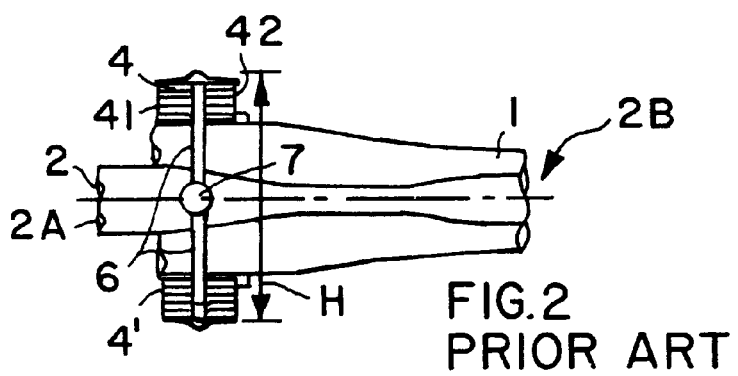
FIG. 2 is a sectional view along the section line II—II of a portion of the prior art rotor blade arrangement according to FIG. 1.

The sectional view of FIG. 2 shows the arrangement of the damping elements 4 and 4' in greater detail along the section plane II—II in FIG. 1. As can be seen in FIG. 2, the control sleeve 1 surrounds the flexbeam 2, and the damping elements 4 and 4' are located generally in the area of the flexbeam root 2A, i.e. the end of the flexbeam 2 that is connected to the rotor head 5. The damping elements 4 and 4' are respectively located above and below the lead-lag oscillation plane in a perpendicular direction, namely above and below the control sleeve 1. In order to provide the required degree of damping, each damping element 4 and 4' requires a plurality of elastomeric damping layers 41, 42, which results in a relatively high total structural height H. Since the damping elements 4 and 4' are arranged outside of the control sleeve 1, they have a disadvantageous effect on the aerodynamics of the overall rotor blade R and control sleeve arrangement, and further can hinder or limit the free mobility of the control rods or the rotor head cover.

In order to support the control sleeve 1 relative to the flexbeam 2 in a damped flexible manner, each damping element 4 and 4' is respectively connected on one side to the control sleeve 1, and on the other side to a control sleeve support rod 6, which in turn is connected to a support bearing 7 arranged in or on the flexbeam 2. With this arrangement, the relatively stiff control sleeve 1 according to the prior art can move as a unit with the airfoil blade 3 and be dampingly deflected relative to the root end 2A of the flexbeam 2, as will now be described in connection with FIG. 3.

FIG. 3 is a schematic diagram illustrating the functional principle of the damping kinematics according to the conventional damping arrangement shown in FIGS. 1 and 2. When the rotor blade 3 undergoes a lead-lag movement in the lead-lag plane corresponding to the drawing plane, it results in a deflection of the lengthwise central axis of the head end 2B of the flexbeam 2 from the initial axis $ML_0$ at the position A1 to the axis $ML_1$ at position A2, and then a reverse deflection of the blade back to its initial position, and then a successive oscillations back and forth. Thus, the airfoil blade 3 deflects through an angular range $\xi$ with respect to the lengthwise central axis. Due to the rigid connection of the air foil blade 3 to the relatively rigid control sleeve 1 in the prior art arrangement, the control sleeve 1 acts as a rigid extension of the airfoil blade 3, and is therefore deflected relative to the root end 2A of the flexbeam 2, because the flexbeam 2 undergoes a lead-lag flexing about the lead-lag hinge SG. As a result, each damping element 4 and 4' is deflected, i.e. the elastomeric layers of each damping element undergo a shear strain and deflection.

FIG. 3 particularly shows the shear strain and deflection of the upper damping element 4, whereby the upper elastomeric layer 42 is displaced relative to the lower elastomeric layer 41, or vice versa. In other words, the lower elastomeric layer 41 moves together with the control sleeve 1, while the upper elastomeric layer 42 remains substantially fixed relative to the root end 2A of the flexbeam 2 through the control sleeve support rod 6, as schematically illustrated in FIG. 3 by the displaced projection images of the elastomeric layers 41 and 42. Similar considerations apply to the lower damping element 4'.

The total damper deflection S, i.e. the deflection of a respective damping element 4 or 4', is at least approximately given by the following Formula (1).

$$S \approx a * \tan \xi \qquad \text{Formula (1)}$$

or more accurately by Formula (1A)

$$S = 2a * \sin(\tfrac{1}{2}\xi) \qquad \text{Formula (1A)}$$

wherein $\xi$ is the lead-lag pivoting angle as mentioned above and the factor a is the spacing or distance between the control sleeve support rod 6 and the lead-lag hinge SG. For structural reasons, the spacing a cannot be varied or changed in any manner as desired. Particularly, due to strength and stiffness considerations, it is not possible to move the location of the fictitious lead-lag hinge SG closer to the root end 2A of the flexbeam 2. On the other hand, the control sleeve support rod 6 must be secured to the stiff inboard or root end portion of the flexbeam 2 and can therefore not be moved to a position further outward along the flexbeam 2 so as to be closer to the fictitious lead-lag hinge SG. For these reasons, it is not possible to reduce the spacing a, so that it is not possible to reduce the damper deflection S for a given angular range of lead-lag oscillation, using the prior art geometry.

FIG. 4 is a schematic diagram generally corresponding to that of FIG. 3, but showing the functional principle of the damping kinematics of the arrangement of damping elements 40 and 40' according to the invention. As will be discussed in detail below, the damping elements 40 and 40' are differently arranged and located in comparison to the damping elements 4 and 4' according to the prior art. Particularly, the damping elements 40 and 40' in the inventive arrangement are located between the fictitious lead-lag hinge SG of the flexbeam 2 and the location at which the flexbeam 2 is connected to or transitions into the airfoil blade 3 in the transition region T. The flexbeam head 2B is essentially incorporated into this transition region T, which may be embodied either without a junction in a one-piece rotor construction or with a junction or joint J in a two-piece rotor construction. This transition region T is also the region in which the torsional moments for achieving a pitch angle control are transmitted from the control sleeve 1 into the lift-generating airfoil blade 3. The outboard end of the control sleeve 1 ends with a gap between the sleeve 1 and the airfoil blade 3 as shown in FIG. 5, and the control sleeve 1 is not connected directly to the airfoil blade 3. Rather, the damping elements 40 and 40' provide a damping connection as will be described in detail below.

The arrangement of the damping elements 40 and 40' in the area between the fictitious lead-lag hinge SG and the transition region T or the outboard end of the control sleeve 1 thus involves positioning the damping elements 40 and 40' generally near the head end 2B of the flexbeam 2. This is a considerable and basic distinction of the invention over the prior art, which only includes arrangements of the damping elements in the area of the root end 2A of the flexbeam. The inventive arrangement achieves several advantages, such as better utilization of space available within the control sleeve, and a better damping effect with reduced damper displacement due to a different geometry.

Specifically, the inventive arrangement of damping elements 40 and 40' near the flexbeam head 2B makes it possible to use smaller damping elements (as compared to the prior art) which can be located entirely within the control sleeve 1, either above or below the lead-lag plane, or lying in the lead-lag plane to the sides of the flexbeam, without detracting from the aerodynamics of the control sleeve and without requiring any disadvantageous alteration of the transition region T or a joint or junction J that may be included therein. Also, the invention expressly avoids the arrangement of damping elements at the root end 2A of the flexbeam 2, and the arrangement of any damping elements externally of the control sleeve 1.

A substantial advantage of the inventive arrangement is that the damper deflection is considerably reduced relative to the prior art without diminishing the damping function. Therefore, the structural height of a respective damping element can be drastically reduced, and particularly by a factor of three or four in comparison to the structural height of conventional damping element arrangements. As a result, it becomes possible to construct a respective damping element using only a single elastomeric layer and completely omitting any metal interlayers.

A particularly advantageous embodiment has the damping elements 40 and 40' arranged within the transition region T of the rotor blade R, and particularly substantially laterally next to the flexbeam 2 so that the damping elements lie in or on the lead-lag plane $S_E$. In this context, the damping elements 40 and 40' are arranged entirely within the control sleeve 1. Also, the damping elements 40 and 40' are not directly connected with the control rod St of the rotor blade R. Therefore, they are not subjected to the entire relative deflection resulting from the torsion of the inboard end of the control sleeve 1 relative to the root end 2A of the flexbeam 2, caused by the torsional actuation by the control rod St.

The present inventive arrangement of the damping elements 40 and 40' is applicable to a one-piece rotor construction or a two-piece rotor construction having a joint or junction J in the transition region T. In the latter case, the connection between the flexbeam head 2B and the lift-generating airfoil blade 3 is typically achieved by means of a securing plate 8 or mounting fixture 8 and associated connecting means such as bolts or rivets or the like. Such a removable connection via a securing plate 8 is desirable for allowing a replacement or folding of the airfoil blade 3, as discussed above. It is further advantageous that the space existing within the control sleeve 1 to enclose this junction region J can simultaneously be used to enclose the damping elements 40 and 40'. For this reason, the end of the control sleeve 1 at the area of the flexbeam root 2A can be made smaller and substantially more aerodynamic as compared to the prior art, because the damping elements that would conventionally be arranged near the flexbeam root are omitted.

The various specific embodiments of the arrangements of damping elements according to the invention as shown and described in detail in connection with subsequent FIGS. 5, 6, 7, and 8, all correspond to the basic functional principle illustrated schematically in FIG. 4. In this context, the damper deflection S for the arrangement according to FIG. 4 is determined at least approximately by the Formula (2):

$$S = L_1 - L_2 \qquad \text{Formula (2)}$$

wherein $$L_1 = \sqrt{h_1^2 + (a+b_1)^2} \qquad \text{Formula (3)}$$

$h_1 = c \ast \sin \alpha$ $b_1 = c \ast \cos \alpha$ $$L_2 = \sqrt{h_2^2 + (a+b_2)^2} \qquad \text{Formula (4)}$$

$h_2 = c \ast \sin (\alpha + \xi)$ $b_2 = c \ast \cos (\alpha + \xi)$

In Formulas (2) and (3), the subscript 1 represents the initial or starting condition of the lead-lag oscillation, while in formulas (2) and (4), the subscript 2 represents the maximum pivoted condition in the lead-lag direction, i.e. the maximum deflection of the elastomeric layers of the damping elements as a result of shear strain or deflection.

The initial condition before the deflection is shown by position A1 of the lengthwise central axis $ML_0$ of the flexbeam 2 in FIG. 4. On the other hand, the deflected condition of the flexbeam is shown by the lengthwise central axis $ML_1$ at position A2. With this deflection of the blade and particularly of the flexbeam about the lead-lag pivot hinge SG, the result is an angular deflection through the deflection angle $\xi$.

In the inventive arrangement, the control sleeve support rod 6 rigidly supports or fixes the inboard end of the control sleeve 1 in the area of the flexbeam root 2A at position A1 of the lengthwise central axis $ML_0$ (but for allowing rotation or pivoting about the rod axis). This is in contrast to the prior art arrangement in which a lateral deflection of the control sleeve 1 relative to the flexbeam root occurs at this location. Accordingly, in the inventive arrangement the necessary displacement or deflection of the control sleeve relative to the flexbeam occurs at the outboard end thereof, in the vicinity of the transition region T. The displacement to which the damping elements are subjected at this location, i.e. with the inventive arrangement geometry, is significantly less than the displacement to which the damping elements were subjected in the prior art arrangements.

In the above formulas for calculating the present damper deflection, the value L represents the length or spacing between the damping element and the point at which the control sleeve support rod 6 connects together the inboard ends of the control sleeve 1 and the flexbeam 2. The spacing a represents the distance between the fictitious lead-lag hinge SG and the fixing location of the control sleeve support rod 6. The length b represents the distance between the fictitious lead-lag hinge SG and the damping element 40, while the length c represents the distance between the fictitious lead-lag hinge SG and the damping element 40'. The angle $\alpha$ is the angle between the deflected head end 2B of the flexbeam 2 and a line passing through the fictitious lead-lag hinge SG and the damping element 40'. The length h is the linear distance between the flexbeam 2 and the damping element 40'.

FIG. 4 schematically illustrates the resulting damper deflection by the respective projection into the drawing plane of the upper elastomeric layer and of the lower elastomeric layer of each respective damping element 40 and 40'. With the present arrangement or geometry, the damper deflection S is primarily dependent on the magnitude of the distance h between the damping element and the flexbeam axis, i.e. the lengthwise central axis of the flexbeam. Especially since the damping elements 40 and 40' are arranged substantially laterally next to the flexbeam 2 in the lead-lag plane (corresponding to the drawing plane) at a small distance h, and at a location on the opposite side of the lead-lag hinge SG relative to the flexbeam root 2A, it is apparent that the resulting damper deflection S is substantially smaller than that in the above described prior art (FIGS. 1 to 3) for the same angular deflection of the airfoil blade 3.

FIG. 5 shows an example arrangement of damping elements in a perspective cut-away view to reveal the interior arrangement within the control sleeve 1. As can be seen, the flexbeam 2 extends in the lengthwise direction of the blade within the control sleeve 1, and a transition region 17 includes a junction J formed by the securing plate 8. The securing plate 8 connects the head 2B of the flexbeam 2 respectively to two connection arms 10 and 10' of the lift-generating airfoil blade 3. Thus, the rotor blade R has a two-piece construction. At the inboard end of the control sleeve 1 directed toward the rotor head, i.e. adjacent the flexbeam root 2A, the control sleeve 1 is supported via a control sleeve support rod 6 on a corresponding support bearing connected to the flexbeam 2. The damping elements 40 and 40' are arranged near the flexbeam head 2B, substantially laterally next to the flexbeam 2. Particularly, the damping elements 40 and 40' are arranged to lie in the lead-lag plane SE of the rotor blade R. The arc arrow SR indicates the possible lead-lag pivoting direction of the rotor blade R in the lead-lag plane SE Also, the damping elements 40 and 40' are located entirely within the space enclosed inside the control sleeve 1.

Connecting means such as screws, bolts, rivets, pins or the like 9, 9', 11, 11' securely connect the damping elements 40 and 40' to the sleeve wall of the control sleeve 1. Other connecting means not shown connect the damping elements to the securing plate 8. These other connecting means may be screws, bolts or the like, or may involve adhesive bonding or in-place molding of the damping elements onto the securing plate 8. With this arrangement of the damping elements 40 and 40', there is provided a damping connection between the outboard end of the control sleeve 1 and the securing plate 8, which in turn is rigidly connected to the flex beam head and the root of the airfoil blade. The outboard end of the control sleeve 1 is not otherwise connected to the airfoil blade, except through the just-described damping connection. It is possible with this arrangement, as shown and described in connection with FIG. 4, to reduce the damper deflection S. Due to the reduced overall damper deflection S, there is a reduced shear strain, and therefore each damping element can have a reduced number of elastomeric layers, and/or thinner elastomeric layers, possible without any stiff interlayers, whereby the total structural height of the damping elements can be substantially smaller than that of the prior art. Also, the improved arrangement of the damping elements reduces the degree of loading applied to each individual damping element, and thereby the operating life of each damping element is increased.

FIG. 6 is an exploded view of the components of the arrangement in FIG. 5, namely the flexbeam 2, the torsionally stiff control sleeve 1, the lift-generating airfoil blade 3, the damping elements 40 and 40', and the securing plate 8, which has holes therein for receiving any suitable securing or connecting means. The securing plate 8 is substantially U-shaped, with an elongated hole or opening in the saddle of the U-shape in which the flexbeam head 15 can be received. Once the flexbeam head 15 has been inserted through the elongated hole in the saddle of the U-shape, it is received between two walls of the securing plate 8 and properly positioned, so that securing means such as bolts can be secured through the illustrated holes in the flexbeam head 15 and the securing plate 8 to achieve a rigid and secure connection between therebetween. The connection arms 10 and 10' of the airfoil blade 3 are similarly received between the walls of the securing plate 8 and fixed or secured by means of bolts or the like passing through corresponding holes.

Two legs 8.1 and 8.2 extend on the two sides of the saddle of the U-shape of the securing plate 8, and are adapted to receive the damping elements 40 and 40' mounted thereon or connected thereto. For example, the leg 8.1 is received in the interior or central plane of the damping element 40, i.e. sandwiched between elastomeric layers of the damping element 40. The damping element 40' is analogously mounted on the leg 8.2. The securing means 9, 9' and 11, 11', such as bolts or the like, are connected to the control sleeve 1 through respective suitable holes provided therein so as to connect the damping elements 40 and 40' to the control sleeve 1, without however establishing a rigid connection between the control sleeve 1 and the securing plate 8, as described above. An analogous connection via bolts or the like is provided on the bottom side of each damping element. When assembling the damping elements 40 and 40' onto the securing plate 8, it is also possible to arrange a plurality of damping elements stacked one above another, i.e. with a plurality of elastomeric layers for example.

FIG. 7 shows a particularly advantageous embodiment of the flexbeam head 16, which is directly configured as a securing plate 16, to avoid the need of a separate securing plate 8 as shown in FIG. 6, which would have to be separately connected to the flexbeam head. The rest of the arrangement and assembly as described above in connection with FIGS. 5 and 6 correspondingly pertains to an embodiment using the integral flex beam head securing plate 16 of FIG. 7. It is simply no longer necessary to mount and assemble a separate securing plate onto the flexbeam.

FIG. 8 shows a further embodiment in which a plurality of individual damping elements 40.0, 40.1, 40.2 and 40.3 for example, are connected to a securing plate 8 or to a flexbeam head 16 that is embodied as a securing plate. These individual damping elements 40.0, 40.1, 40.2 and 40.3 are arranged in a single plane, one after the other in a respective row parallel to the lengthwise central axis ML on each side of the flexbeam 2. With this arrangement, the damping elements 40.0 and 40.1 functionally correspond to the single damping element 40, while the damping elements 40.2 and 40.3 functionally correspond to the single damping element 40'. The use of such individual damping elements arranged in a row on each side of the flexbeam 2 allows a modular assembly or adaptation using a single type of damping element to provide differing degrees of total damping effect in different applications. Also, the lateral dimension of the damping assembly and therewith that of the control sleeve can be reduced.

FIG. 9 shows the arrangement of damping elements 40 and 40' in an example embodiment of a one-piece rotor blade R without a junction or joint between the flexbeam 2 and the lift-generating airfoil blade 3. Just as in the other embodiments described above, the flexbeam 2 is surrounded by the control sleeve 1, of which the inboard end is supported via the control sleeve support rods 6 on a support bearing. A securing plate 8 is arranged in the transition region 17 where the flexbeam 2 seamlessly transitions into the airfoil blade 3, so as to provide a mounting location for the damping elements 40 and 40'. For example, four bolts are used to connect the securing plate 8 to the area of the transition from the flexbeam 2 to the airfoil blade 3. The damping elements 40 and 40' are secured by securing means such as bolts or the like 9, 9', 11, 11' to the control sleeve 1, and separately to the securing plate 8 similarly as described above. Once again, the damping elements 40 and 40' are located in the lead-lag plane SE laterally to the sides of the flexbeam 2.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A rotor blade arrangement for a bearingless rotor of a helicopter, comprising a rotor blade, a control sleeve and at least one damping element, wherein:

said rotor blade comprises a flexbeam and an airfoil blade;

said flexbeam has a flexbeam root end adapted to be connected to a rotor head of the helicopter and a flexbeam head end opposite said flexbeam root end, and includes at least one flexible portion between said flexbeam root and head ends forming a virtual lead-lag hinge that allows flexible bending of said flexbeam in a lead-lag plane about said lead-lag hinge;

said airfoil blade has a blade root connected to said flexbeam head end and an airfoil portion extending from said blade root along a blade lengthwise axis in an outboard direction away from said flexbeam root end;

said control sleeve extends along and surrounds at least a majority of said flexbeam, with said majority of said flexbeam located in a substantially enclosed space within said control sleeve;

said at least one damping element is arranged and adapted to damp lead-lag oscillations of said rotor blade involving flexible bending of said flexbeam in said lead-lag plane about said lead-lag hinge; and said at least one damping element is connected to said control sleeve and is connected to said rotor blade at a first location displaced outboard from said lead-lag hinge in said outboard direction away from said flexbeam root end.

2. The rotor blade arrangement according to claim 1, wherein said at least one damping element is arranged in a transition region of said arrangement extending along said blade lengthwise axis, in which said blade root is connected to said flexbeam head end.

3. The rotor blade arrangement according to claim 2, wherein said location at which said at least one damping element is connected to said rotor blade is in said transition region.

4. The rotor blade arrangement according to claim 2, wherein said at least one damping element is connected to said control sleeve in said transition region.

5. The rotor blade arrangement according to claim 2, wherein said at least one damping element provides the only connection between said control sleeve and said rotor blade in said transition region.

6. The rotor blade arrangement according to claim 5, further comprising a support rod that connects said control sleeve to said flexbeam at a second location displaced inboard from said lead-lag hinge in an inboard direction opposite said outboard direction, in a manner to allow relative pivoting of said flexbeam and said control sleeve about said support rod and parallel to said lead-lag plane and to prevent relative lateral displacement of said flexbeam and said control sleeve parallel to said lead-lag plane at said second location.

7. The rotor blade arrangement according to claim 1, further comprising a support rod that connects said control sleeve to said flexbeam at a second location displaced inboard from said lead-lag hinge in an inboard direction opposite said outboard direction, in a manner to allow relative pivoting of said flexbeam and said control sleeve about said support rod and parallel to said lead-lag plane and to prevent relative lateral displacement of said flexbeam and said control sleeve parallel to said lead-lag plane at said second location.

8. The rotor blade arrangement according to claim 1, wherein said at least one damping element is arranged in said substantially enclosed space within said control sleeve laterally next to said flexbeam on said lead-lag plane.

9. The rotor blade arrangement according to claim 8, comprising at least two of said damping elements, respectively arranged laterally next to said flexbeam on opposite sides of said flexbeam on said lead-lag plane.

10. The rotor blade arrangement according to claim 1, wherein said at least one damping element is removably connected to said control sleeve and removably connected to said rotor blade.

11. The rotor blade arrangement according to claim 1, wherein said rotor blade further comprises a securing plate connected to at least one of said flexbeam head end and said blade root, and wherein said at least one damping element is connected to said securing plate and to said control sleeve.

12. The rotor blade arrangement according to claim 11, wherein said flexbeam and said airfoil blade are discrete and separable from each other, and wherein said blade root is removably connected to said flexbeam head end via said securing plate.

13. The rotor blade arrangement according to claim 11, wherein said flexbeam and said airfoil are continuously, integrally and inseparably connected with each other via said flexbeam head end and said blade root.

14. The rotor blade arrangement according to claim 11, wherein said securing plate is integrally formed as an extension of said flexbeam that is integrally connected to said flexbeam head end.

15. The rotor blade arrangement according to claim 1, comprising a plurality of said damping elements arranged stacked one above another in a direction perpendicular to said lead-lag plane.

16. The rotor blade arrangement according to claim 15, wherein respective ones of said damping elements are arranged respectively above and below said lead-lag plane laterally next to said flexbeam on two opposite sides of said flexbeam.

17. The rotor blade arrangement according to claim 1, wherein each said damping element consists essentially of a single elastomeric damping material layer without any interposed stiffening layer.

18. The rotor blade arrangement according to claim 1, comprising a plurality of said damping elements arranged on said lead-lag plane in a row adjacent one another laterally next to said flexbeam.

19. The rotor blade arrangement according to claim 18, wherein said row extends parallel to said blade lengthwise axis.

20. The rotor blade arrangement according to claim 1, excluding any damping element arranged at a second location displaced inboard from said lead-lag hinge in an inboard direction opposite said outboard direction, and excluding any damping element outside of said space within said control sleeve.

21. A rotor blade arrangement for a bearingless rotor of a helicopter, comprising a rotor blade, a control sleeve and at least one damping element, wherein:

said rotor blade comprises a flexbeam and an airfoil blade;

said flexbeam has a flexbeam root end adapted to be connected to a rotor head of the helicopter and a flexbeam head end opposite said flexbeam root end, and includes at least one flexible portion between said flexbeam root and head ends that allows flexible bending of said flexible portion of said flexbeam in a lead-lag plane;

said airfoil blade has a blade root connected to said flexbeam head end and an airfoil portion extending from said blade root along a blade lengthwise axis in an outboard direction away from said flexbeam root end;

said control sleeve extends along and surrounds at least a majority of said flexbeam, with said majority of said flexbeam located in a substantially enclosed space within said control sleeve;

said at least one damping element is arranged and adapted to damp lead-lag oscillations of said rotor blade involving flexible bending of said flexible portion of said flexbeam in said lead-lag plane; and said at least one damping element is connected to said control sleeve and is connected to said rotor blade at a first location displaced outboard from said flexible portion in said outboard direction away from said flexbeam root end.

* * * * *

UNITED STATES PATENT AND TRADEMARK OFFICE
CERTIFICATE OF CORRECTION

PATENT NO. : 6,196,800 B1
DATED : March 6, 2001
INVENTOR(S) : Bauer et al.

It is certified that error appears in the above-identified patent and that said Letters Patent is hereby corrected as shown below:

Column 7,
Line 9, after "sleeve 1", insert -- according to the prior art --;
Line 36, after "sleeve 1", delete "according to --;
Line 37, before "can", delete "the prior art".

Column 10,
Line 60, after "deflection", insert -- S --.

Signed and Sealed this

Sixteenth Day of October, 2001

Attest:

NICHOLAS P. GODICI
*Attesting Officer*     *Acting Director of the United States Patent and Trademark Office*